US011726855B1

(12) United States Patent
Hung et al.

(10) Patent No.: US 11,726,855 B1
(45) Date of Patent: Aug. 15, 2023

(54) CONTROLLING ACCESS TO AN ERROR RECORD SERIALIZATION TABLE OF AN INFORMATION HANDLNG SYSTEM

(71) Applicant: Dell Products L.P., Round Rock, TX (US)

(72) Inventors: Yaohui Hung, Taipei (TW); David Keith Chalfant, Round Rock, TX (US); Poyu Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/660,740

(22) Filed: Apr. 26, 2022

(51) Int. Cl.
*G06F 11/00* (2006.01)
*G06F 11/07* (2006.01)
*G06F 21/31* (2013.01)
*G06F 11/14* (2006.01)

(52) U.S. Cl.
CPC ...... *G06F 11/0772* (2013.01); *G06F 11/0787* (2013.01); *G06F 11/1405* (2013.01); *G06F 21/31* (2013.01)

(58) Field of Classification Search
CPC ............. G06F 11/0772; G06F 11/0787; G06F 11/1405
See application file for complete search history.

(56) References Cited

U.S. PATENT DOCUMENTS

| | | | | |
|---|---|---|---|---|
| 11,106,529 | B1* | 8/2021 | Chao | G06F 11/0727 |
| 11,366,710 | B1* | 6/2022 | Hung | G06F 11/0751 |
| 2017/0147484 | A1* | 5/2017 | Kumar | G06F 9/445 |
| 2020/0151048 | A1* | 5/2020 | Shantamurthy | G06F 9/4806 |
| 2021/0019240 | A1* | 1/2021 | Geng | G06F 11/1658 |
| 2022/0318093 | A1* | 10/2022 | Bulusu | G06F 11/1417 |
| 2023/0009868 | A1* | 1/2023 | Li | G06F 11/0751 |

\* cited by examiner

*Primary Examiner* — Joshua P Lottich
(74) *Attorney, Agent, or Firm* — McDermott Will & Emery LLP

(57) ABSTRACT

Controlling access to an ERST, including: triggering, in response to an occurrence of an error, a SMI; adjusting, in response to the SMI and by a SMM RAS handler module, a slate of an access gate from a locked state to an unlocked state, the access gate controlling access to an ERST storage region; generating, by an OS MCE handler, an error record based on the error; accessing, by the OS MCE handler, an ACPI ERST to identify instructions for storing the error record at the ERST storage region; triggering, in response to the instructions and by the OS MCE handler, an additional SMI; determining, in response to the additional SMI and by a SMM handler, that the access gate is in the unlocked state; in response to determining that the access gate is in the unlocked state: storing, by the SMM handler, the error record at the ERST.

20 Claims, 3 Drawing Sheets

CONTROLLING ACCESS TO AN ERROR RECORD SERIALIZATION TABLE OF AN INFORMATION HANDLNG SYSTEM

BACKGROUND

Field of the Disclosure

The disclosure relates generally to an information handling system, and in particular, controlling access to an error record serialization table of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of controlling access to an error record serialization table, including: triggering, in response to an occurrence of an error during initialization and operation of an operating system (OS) of an information handling system, a system management interrupt (SMI); adjusting, in response to the SMI and by a system management mode (SMM) reliability availability serviceability (RAS) handler module, a state of an access gate from a locked state to an unlocked state, the access gate controlling access to an error record serialization table (ERST) storage region stored by a persistent storage device of the information handling system; generating, by an OS machine-check exception (MCE) handler, an error record based on the error; accessing, by the OS MCE handler, an advanced configuration and power interface (ACPI) ERST to identify instructions for storing the error record at the ERST storage region; triggering, in response to the instructions and by the OS MCE handler, an additional SMI; determining, in response to the additional SMI and by a SMM handler, that the access gate is in the unlocked state; in response to determining that the access gate is in the unlocked state: storing, by the SMM handler, the error record at the ERST; and adjusting, by the SMM handler, the state of the access gate from the unlocked state to the locked state.

Other embodiments of these aspects include corresponding systems, apparatus, and computer programs, configured to perform the actions of the methods, encoded on computer storage devices.

These and other embodiments may each optionally include one or more of the following features. For instance, after adjusting the state of the access gate from the unlocked state to the locked state, returning execution to the OS. Determining, in response to the SMI and by the SMM handler, that the access gate is in the locked state, and in response, blocking, by the SMM handler, writing of the error record to the ERST storage region. During power-on self-test (POST) at the information handling system, creating the access gate. Storing the ERST at the persistent storage device; and generating the instructions that include operations for reading, writing, and clearing at the persistent storage device. Scanning, in response to the SMI and by the SMM RAS handler, machine check banks to identify a valid machine check error signature for the error. A SMM ERST logging module includes the access gate and the SMM handler.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
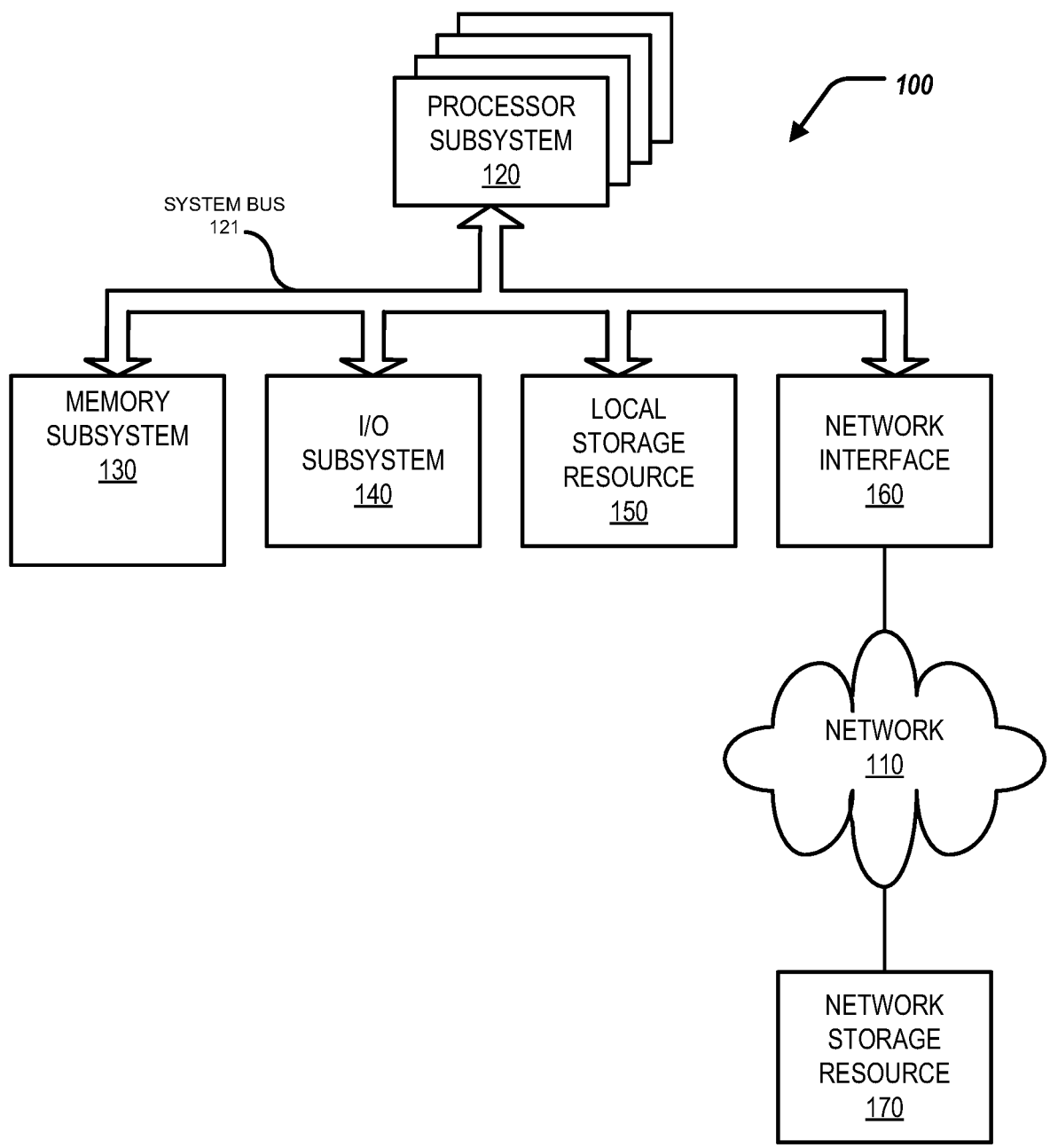
FIG. 1 is a block diagram of selected elements of an embodiment of an information handling system.

This disclosure discusses methods and systems for controlling access to an error record serialization table of an information handling system. In short, access to a persistent data store of the information handling system can be controlled/managed to prevent malicious actors from gaining control of the data store, and storing unwanted data at the data store. An access gate can control access to the data store, and include two states—locked and unlocked. To that end, when an uncorrectable error occurs that is to be noted in a table stored by the data store, only BIOS firmware has the ability to unlock the access gate. The access gate can authorize an operating system (OS) machine-check exception (MCE) handler to access the storage device when the OS issues a command sequence for writing an error record to the storage device.

Specifically, this disclosure discusses a system and a method for controlling access to an error record serialization table, including: triggering, in response to an occurrence of an error during initialization and operation of an operating system (OS) of an information handling system, a system management interrupt (SMI); adjusting, in response to the SMI and by a system management mode (SMM) reliability availability serviceability (RAS) handler, a state of an access gate from a locked state to an unlocked state, the access gate controlling access to an error record serialization table (ERST) storage region stored by a persistent storage device of the information handling system; generating, by an OS machine-check exception (MCE) handler, an error record based on the error; accessing, by the OS MCE handler, an advanced configuration and power interface (ACPI) ERST to identify instructions for storing the error record at the ERST storage region; triggering, in response to the instructions and by the OS MCE handler, an additional SMI; determining, in response to the additional SMI and by a SMM handler, that the access gate is in the unlocked state; in response to determining that the access gate is in the unlocked state: storing, by the SMM handler, the error record at the ERST; and adjusting, by the SMM handler, the state of the access gate from the unlocked state to the locked state.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
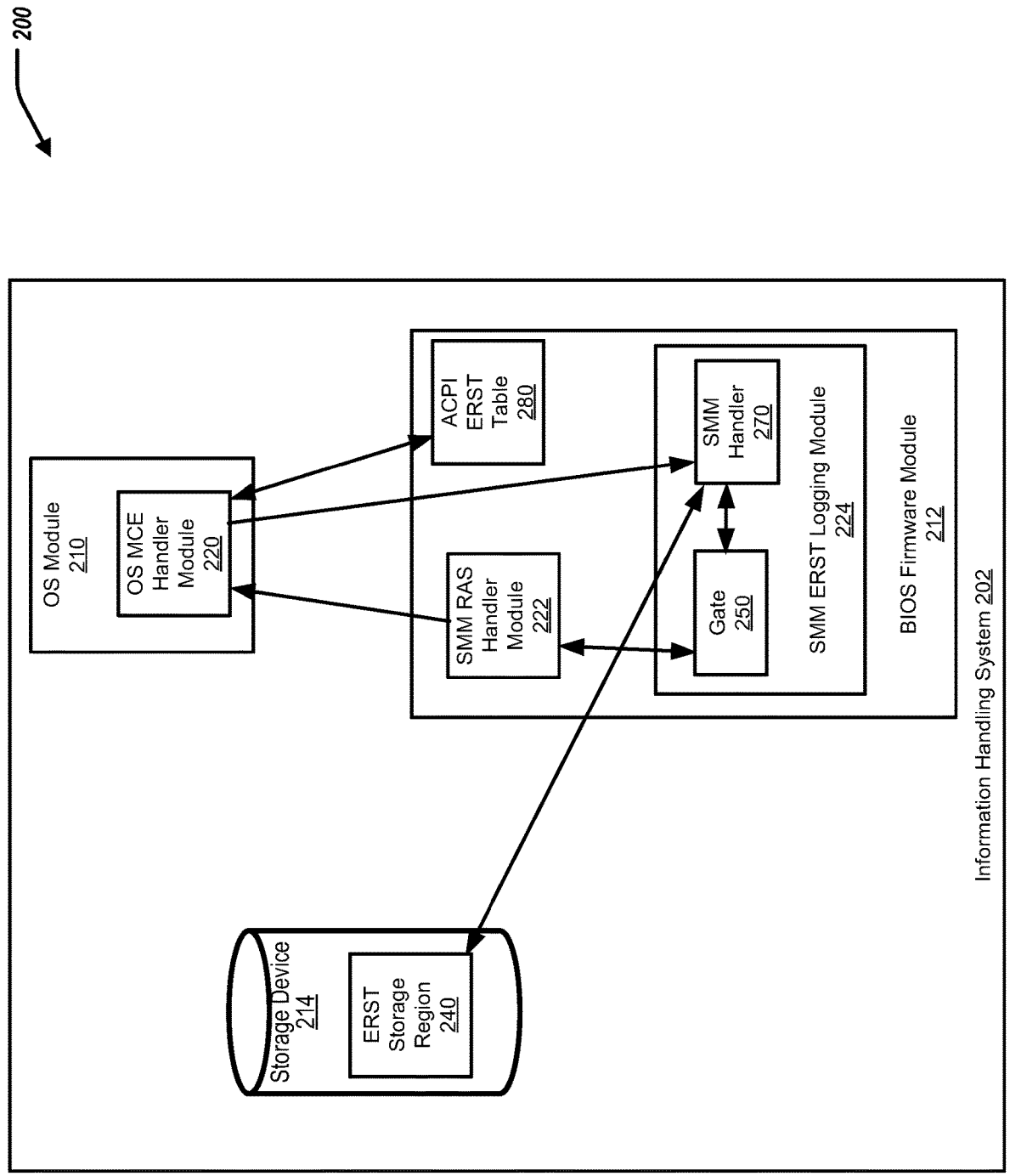
FIG. 2 illustrates a block diagram of an information handling system for controlling access to an error record serialization table of the information handling system
Figure 3:
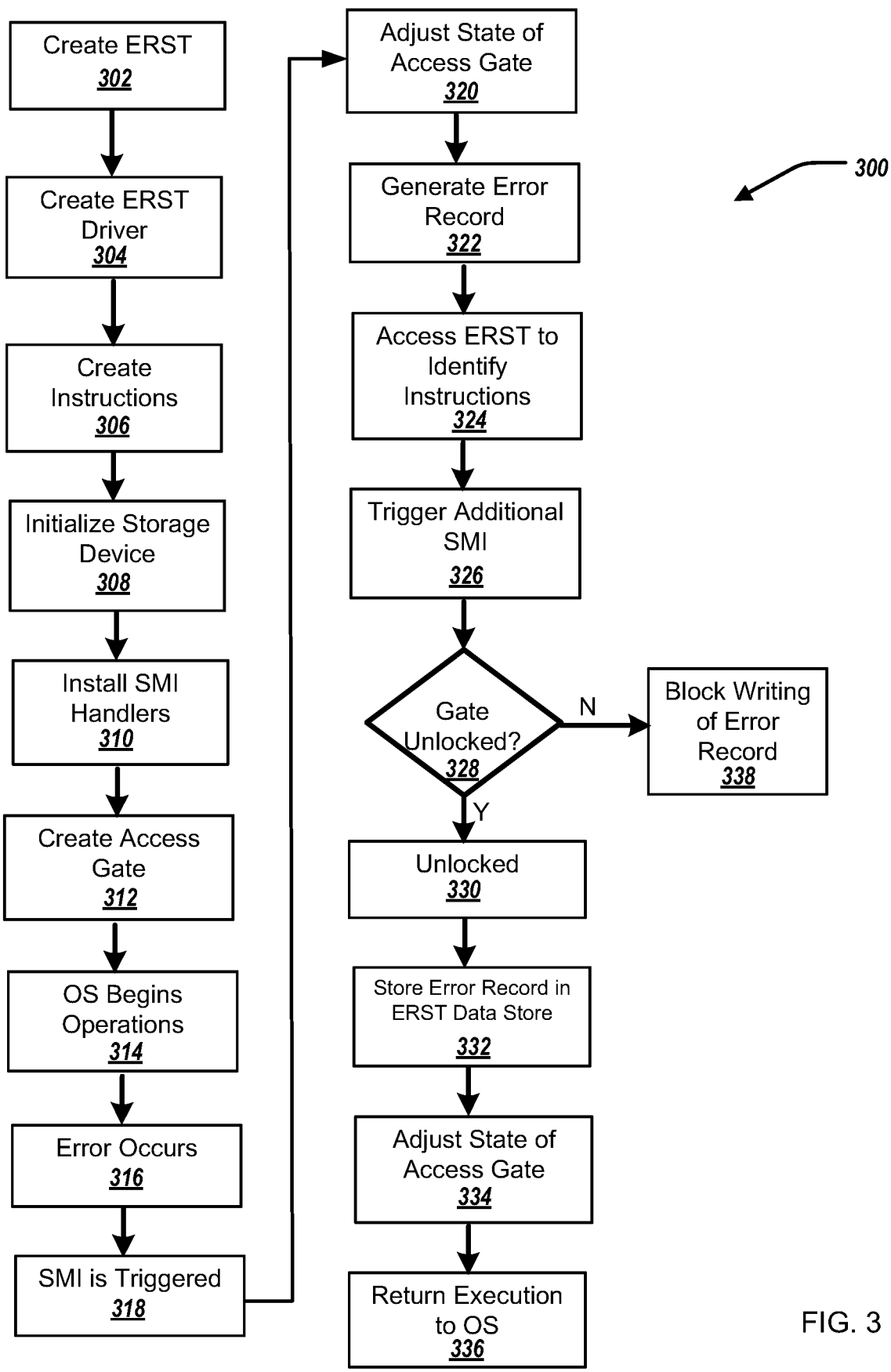
FIG. 3 illustrates a method for controlling access to an error record serialization table of the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, access to a persistent data store of the information handling system (e.g., the local storage resource 150) can be controlled/managed to prevent malicious actors from gaining control of the data store, and storing unwanted data at the data store. An access gate can control access to the data store, and include two states—locked and unlocked. To that end, when an uncorrectable error occurs that is to be noted in a table stored by the data store, only BIOS firmware has the ability to unlock the access gate. The access gate can authorize an operating system (OS) machine-check exception (MCE) handler to access the storage device when the OS issues a command sequence for writing an error record to the storage device.

Turning to FIG. 2, FIG. 2 illustrates an environment 200 including an information handling system 202. The information handling system 202 can include an operating system (OS) module 210, a basic input/output system (BIOS) firmware module 212, and a storage device 214. In some examples, the information handling system 202 is similar to, or includes, the information handling system 100 of FIG. 1. The storage device 214 can be a persistent storage device.

The OS module 210 can include an OS machine-check exception (MCE) handler module 220. The BIOS firmware module 212 can include a system management mode (SMM) reliability availability serviceability (RAS) handler module 222, an advanced configuration and power interface (ACPI) error record serialization table (ERST) 280, and a SMM ERST logging module 224. The SMM ERST logging module 224 can include a gate 250 and a SMM handler 270.

The OS module 210 can be in communication with the BIOS firmware module 212. In particular, the OS MCE handler module 220 can be in communication with the SMM handler 270, and the ACPI ERST 280. The BIOS firmware module 212 can be in communication with the OS module 210 and the storage device 214. In particular, the SMM handler 270 can be in communication with an ERST storage region 240 of the storage device 214. Additionally, the SMM RAS handler module 222 can be in communication with the gate 250, and the SMM handler 270 can be in communication with the gate 250.

FIG. 3 illustrates a flowchart depicting selected elements of an embodiment of a method 300 for controlling access to an error record serialization table of an information handling system. The method 300 may be performed by the information handling system 100, the information handling system 202, the OS module 210, and/or the BIOS firmware module 212, and with reference to FIGS. 1-2. It is noted that certain operations described in method 300 may be optional or may be rearranged in different embodiments.

An error record serialization table (ERST) storage region 240 is created and stored at the storage device 214, at 302. The SMM ERST logging module 224 is created that controls the ERST storage region 240, at 304. The logging driver 224 generates (serialized) instructions as the ACPI ERST 280, at 306. The instructions can include operations for reading, writing, and clearing at the storage device 214, and in particular, the ERST storage region 240. That is, the instructions include information necessary to access the storage device 214, and the ERST storage region 240.

The storage device 214 can be initialized in non-volatile RAM of the information handling system 202, at 308. That is, the SMM handler module 270 can retrieve data regarding the ERST storage region 240 for use at OS runtime via registered handlers. The SMM handler module 270 installs system management interrupt (SMI) handlers to process operations requested by the OS module 210 at runtime using the operations in the ACPI ERST 280, at 310.

An access gate 250 can be created, at 312. That is, during the power-on self-test (POST) that is conducted at the information handling system 202, the access gate 250 can be created. The access gate 250 controls access to the ERST storage region 240 through the SMM handler 270, described further herein. The access gate 250 can be stored in SMM memory (e.g., a module/file global variable in the SMM ERST logging module 224), and encapsulated by the SMM ERST logging module 224 via a SMM protocol application programming interface (API).

The BIOS POST ends, and the OS is initialized and begins operations, at 314.

An unrecognized error occurs during initialization and operation of the OS, at 316.

In response to the occurrence of the error, a system management interrupt (SMI) is triggered, at 318. Specifically, the SMM RAS handler module 222 can scan, in response to the SMI, machine check banks to identify a valid machine check error signature for the error.

The SMM RAS handler module 222, in response to the SMI, adjusts a state of the access gate 250 from a locked state to an unlocked state, at 320. That is, the SMM RAS handler module 222 adjusts the state of the access gate 250 for access to the ERST storage region 240.

The SMM RAS handler module 222 will complete and turn execution over the OS MCE Handler module 220.

The OS MCE handler module 220 generates an error record based on the detected error, at 322. In some examples, the error record is a unified extensible firmware interface (UEFI) common platform error record (CPER) that includes the machine check bank error signature information.

The OS MCE handler module 220 access the ACPI ERST 280 to identify the instructions for storing the error records at the ERST storage region 240, at 324. That is, as the access gate 250 is in the unlocked state, the OS MCE handler module 220 can access the ACPI ERST 280 for the instructions.

The OS MCE handler module 220 triggers, in response to the instructions, an additional SMI, at 326. That is, the OS MCE handler module 220 processes the instructions and executes the instructions to trigger the SMI.

The SMM handler 270 determines, in response to the additional SMI, the state of the access gate, at 328.

The SMM handler 270 can determine that the access gate 250 is in the unlocked state, at 330.

The SMM handler 270, in response to determining that the access gate 250 is in the unlocked state, facilities storing of the error record at the ERST storage region 240, at 332. That is, the SMM handler 270 receives the error record from the OS MCE handler module 220, and performs a write operation to the ERST storage region 240 to store the error record.

The SMM handler 270, further in response to determining that the access gate is in the unlocked state, adjusts the state of the access gate 250 from the unlocked state to the locked state, at 334.

The SMM handler module 270 will return execution to the OS module 210, at 336.

The SMM handler 270, in response to determining that the access gate 250 is in the locked state, blocks writing of the error record to the ERST storage region 240, at 338.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of controlling access to an error record serialization table, including:
    triggering, in response to an occurrence of an error during initialization and operation of an operating system (OS) of an information handling system, a system management interrupt (SMI);
    adjusting, in response to the SMI and by a system management mode (SMM) reliability availability serviceability (RAS) handler module, a state of an access gate from a locked state to an unlocked state, the access gate controlling access to an error record serialization table (ERST) storage region stored by a persistent storage device of the information handling system;
    generating, by an OS machine-check exception (MCE) handler, an error record based on the error;
    accessing, by the OS MCE handler, an advanced configuration and power interface (ACPI) ERST to identify instructions for storing the error record at the ERST storage region;
    triggering, in response to the instructions and by the OS MCE handler, an additional SMI;
    determining, in response to the additional SMI and by a SMM handler, that the access gate is in the unlocked state;
    in response to determining that the access gate is in the unlocked state:
        storing, by the SMM handler, the error record at the ERST; and
        adjusting, by the SMM handler, the state of the access gate from the unlocked state to the locked state.

2. The method of claim 1, further comprising after adjusting the state of the access gate from the unlocked state to the locked state, returning execution to the OS.

3. The method of claim 1, further comprising determining, in response to the SMI and by the SMM handler, that the access gate is in the locked state, and in response, blocking, by the SMM handler, writing of the error record to the ERST storage region.

4. The method of claim 1, further comprising during power-on self-test (POST) at the information handling system, creating the access gate.

5. The method of claim 1, further comprising:
storing the ERST at the persistent storage device; and
generating the instructions that include operations for reading, writing, and clearing at the persistent storage device.

6. The method of claim 1, further comprising:
scanning, in response to the SMI and by the SMM RAS handler, machine check banks to identify a valid machine check error signature for the error.

7. The method of claim 1, wherein a SMM ERST logging module includes the access gate and the SMM handler.

8. An information handling system comprising a processor having access to memory media storing instructions executable by the processor to perform operations, comprising:
triggering, in response to an occurrence of an error during initialization and operation of an operating system (OS) of an information handling system, a system management interrupt (SMI);
adjusting, in response to the SMI and by a system management mode (SMM) reliability availability serviceability (RAS) handler module, a state of an access gate from a locked state to an unlocked state, the access gate controlling access to an error record serialization table (ERST) storage region stored by a persistent storage device of the information handling system;
generating, by an OS machine-check exception (MCE) handler, an error record based on the error;
accessing, by the OS MCE handler, an advanced configuration and power interface (ACPI) ERST to identify instructions for storing the error record at the ERST;
triggering, in response to the instructions and by the OS MCE handler, an additional SMI;
determining, in response to the additional SMI and by a SMM handler, that the access gate is in the unlocked state;
in response to determining that the access gate is in the unlocked state:
storing, by the SMM handler, the error record at the ERST; and
adjusting, by the SMM handler, the state of the access gate from the unlocked state to the locked state.

9. The information handling system of claim 8, the operations further comprising after adjusting the state of the access gate from the unlocked state to the locked state, returning execution to the OS.

10. The information handling system of claim 8, the operations further comprising determining, in response to the SMI and by the SMM handler, that the access gate is in the locked state, and in response, blocking, by the SMM handler, writing of the error record to the ERST storage region.

11. The information handling system of claim 8, the operations further comprising during power-on self-test (POST) at the information handling system, creating the access gate.

12. The information handling system of claim 8, the operations further comprising:
storing the ERST at the persistent storage device; and
generating the instructions that include operations for reading, writing, and clearing to the persistent storage device.

13. The information handling system of claim 8, the operations further comprising:
scanning, in response to the SMI and by the SMM handler, machine check banks to identify a valid machine check error signature for the error.

14. The information handling system of claim 8, a SMM ERST logging module includes the access gate and the SMM handler.

15. A non-transitory computer-readable medium storing software comprising instructions executable by one or more computers which, upon such execution, cause the one or more computers to perform operations comprising:
triggering, in response to an occurrence of an error during initialization and operation of an operating system (OS) of an information handling system, a system management interrupt (SMI);
adjusting, in response to the SMI and by a system management mode (SMM) reliability availability serviceability (RAS) handler module, a state of an access gate from a locked state to an unlocked state, the access gate controlling access to an error record serialization table (ERST) storage region stored by a persistent storage device of the information handling system;
generating, by an OS machine-check exception (MCE) handler, an error record based on the error;
accessing, by the OS MCE handler, an advanced configuration and power interface (ACPI) ERST to identify instructions for storing the error record at the ERST;
triggering, in response to the instructions and by the OS MCE handler, an additional SMI;
determining, in response to the additional SMI and by a SMM handler, that the access gate is in the unlocked state;
in response to determining that the access gate is in the unlocked state:
storing, by the SMM handler, the error record at the ERST; and
adjusting, by the SMM handler, the state of the access gate from the unlocked state to the locked state.

16. The computer-readable medium of claim 15, the operations further comprising after adjusting the state of the access gate from the unlocked state to the locked state, returning execution to the OS.

17. The computer-readable medium of claim 15, the operations further comprising determining, in response to the SMI and by the SMM handler, that the access gate is in the locked state, and in response, blocking, by the SMM handler, writing of the error record to the ERST storage region.

18. The computer-readable medium of claim 15, the operations further comprising during power-on self-test (POST) at the information handling system, creating the access gate.

19. The computer-readable medium of claim 15, the operations further comprising:
storing the ERST at the persistent storage device; and
generating the instructions that include operations for reading, writing, and clearing to the persistent storage device.

20. The computer-readable medium of claim 15, the operations further comprising:

scanning, in response to the SMI and by the SMM handler, machine check banks to identify a valid machine check error signature for the error.

\* \* \* \* \*